United States Patent [19]

Anahara et al.

[11] Patent Number: 5,130,188
[45] Date of Patent: Jul. 14, 1992

[54] THREE-DIMENSIONAL FABRIC

[75] Inventors: Meiji Anahara; Hiroshi Ohmori; Yoshiharu Yasui, all of Kariya, Japan

[73] Assignee: Kabushiki Kaisha Toyoda Jidoshokki Seisakusho, Kariya, Japan

[21] Appl. No.: 745,222

[22] Filed: Aug. 14, 1991

[30] Foreign Application Priority Data

Aug. 20, 1990 [JP] Japan ................................. 2-219623

Related U.S. Application Data

[63] Continuation-in-part of Ser. No. 482,345, Feb. 20, 1990.
[51] Int. Cl.$^5$ ................................................ B32B 7/00
[52] U.S. Cl. ..................................... 428/257; 428/222; 428/223; 428/225; 428/224
[58] Field of Search ............... 428/224, 225, 257, 222, 428/223

[56] References Cited

U.S. PATENT DOCUMENTS 5,024,874 6/1991 Yasui et al. ........................ 428/257

Primary Examiner—James J. Bell
Attorney, Agent, or Firm—Brooks Haidt Haffner & Delahunty

[57] ABSTRACT

A three-dimensional fabric is disclosed that includes a built in linkage member. The three dimensional fabric includes a core located in a center portion of the fabric. A multiplicity of axially extending warp yarns are arranged in a plurality of concentric layers about the core. A circumferential yarn is wound in a circumferential direction between various layers of the warp yarns to forming a plurality of circumferential yarn layers. A multiplicity of radial yarns are sequentially woven in the axial and radial directions about various circumferential yarn layers. A solid member is also provided which has a group of axially extending yarn strings secured thereto. The axially extending yarn strings include strings that constitute a portion of at least one of the core and the warp yarns. When the disclosed three-dimensional fabric is used in a composite, it is unnecessary to subject the composite to mechanical processing to attach a coupling part.

7 Claims, 14 Drawing Sheets

Fig. 1
Fig. 2
Fig. 3
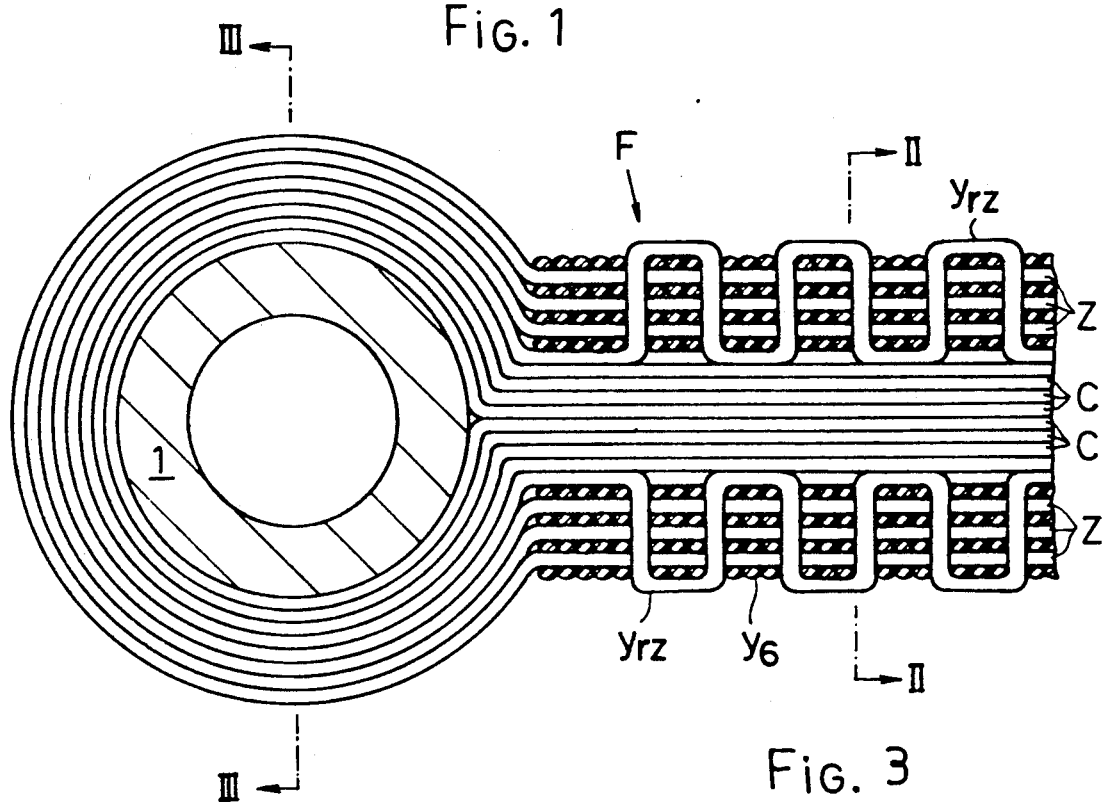
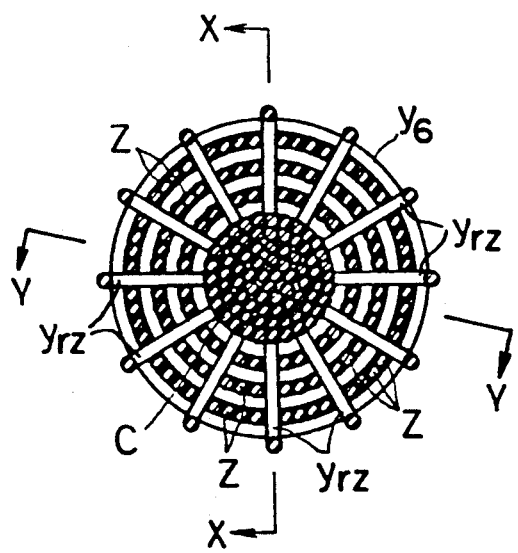
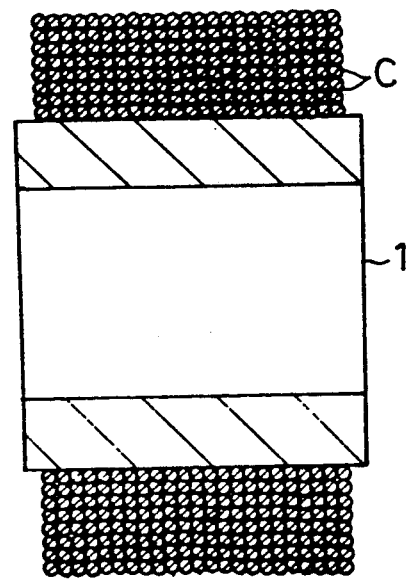

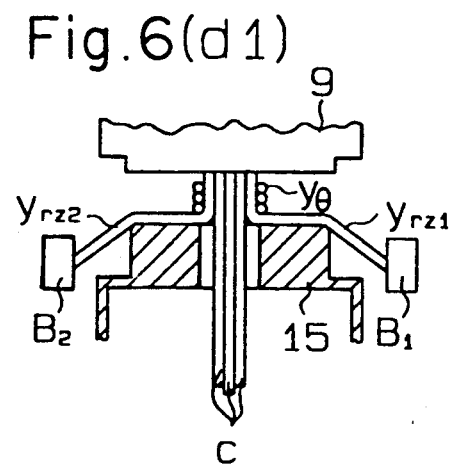
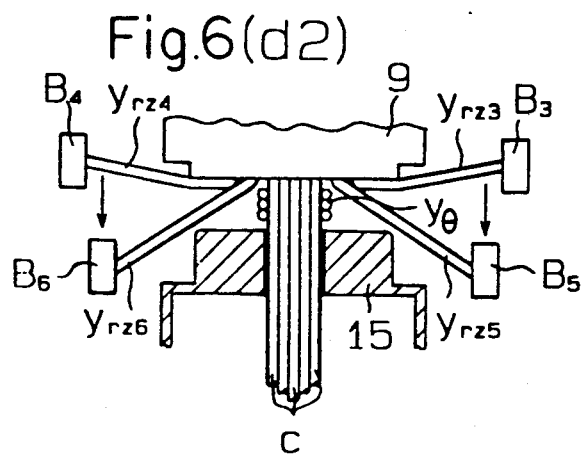
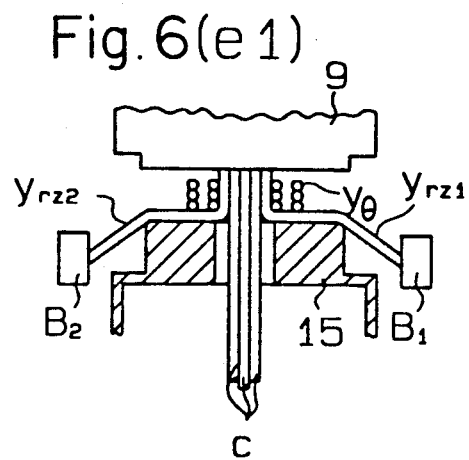
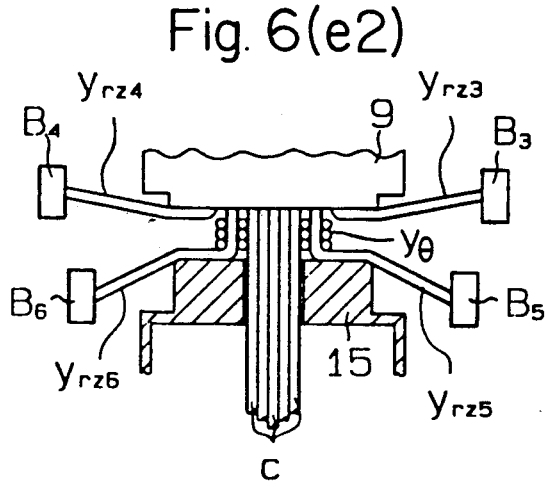
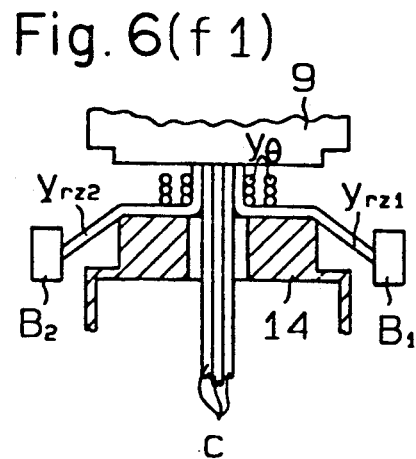
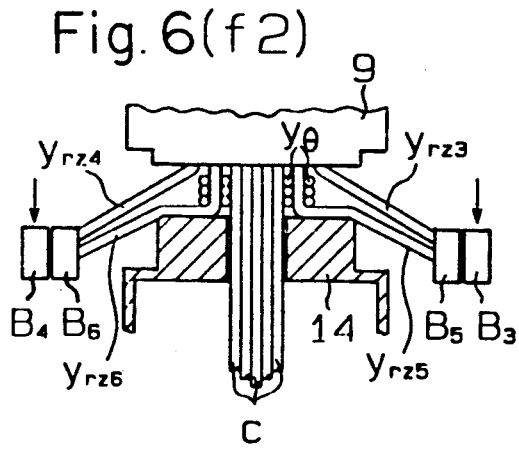

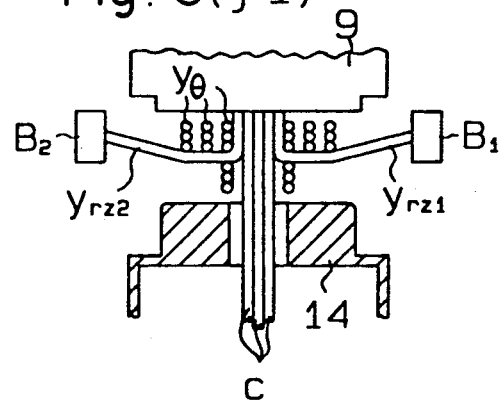
Fig. 6(j1)
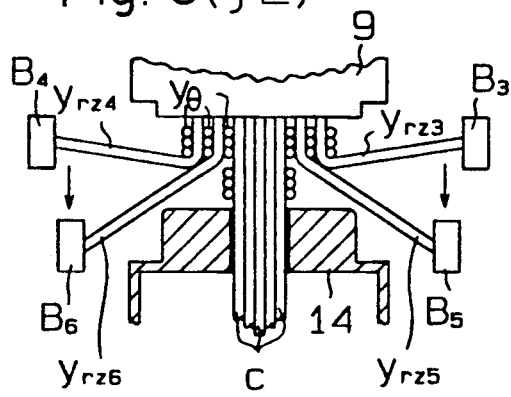
Fig. 6(j2)
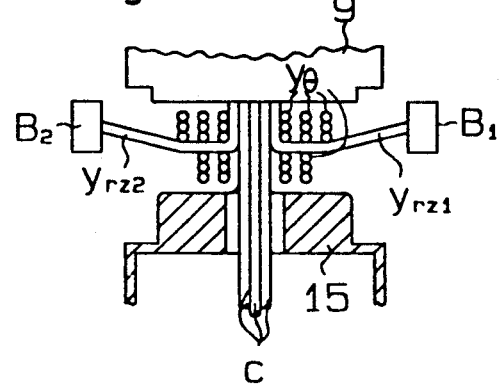
Fig. 6(k1)
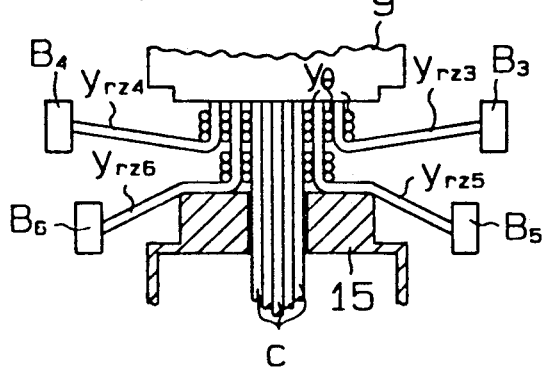
Fig. 6(k2)
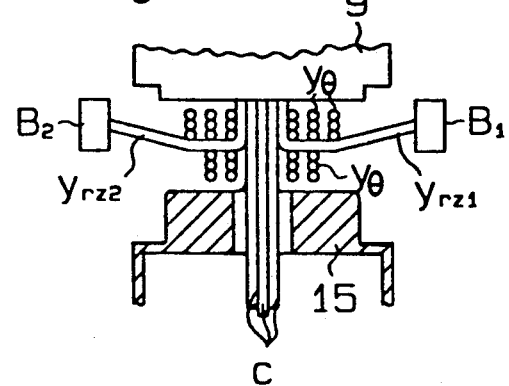
Fig. 6(ℓ1)
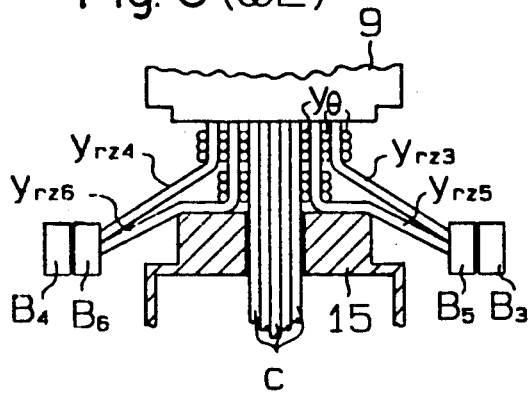
Fig. 6(ℓ2)

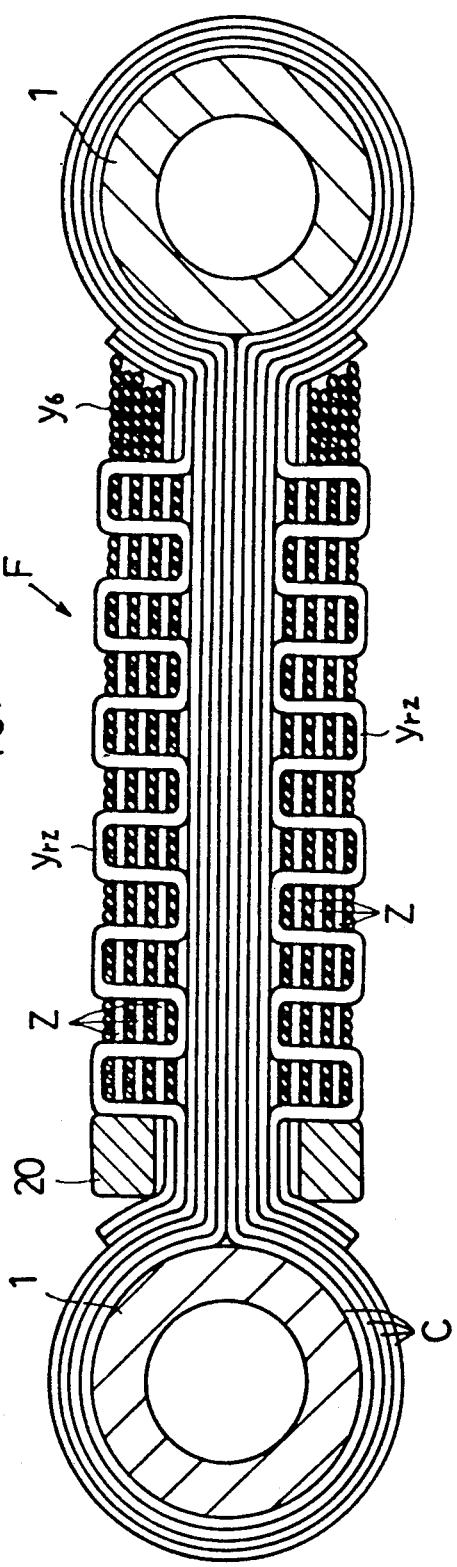
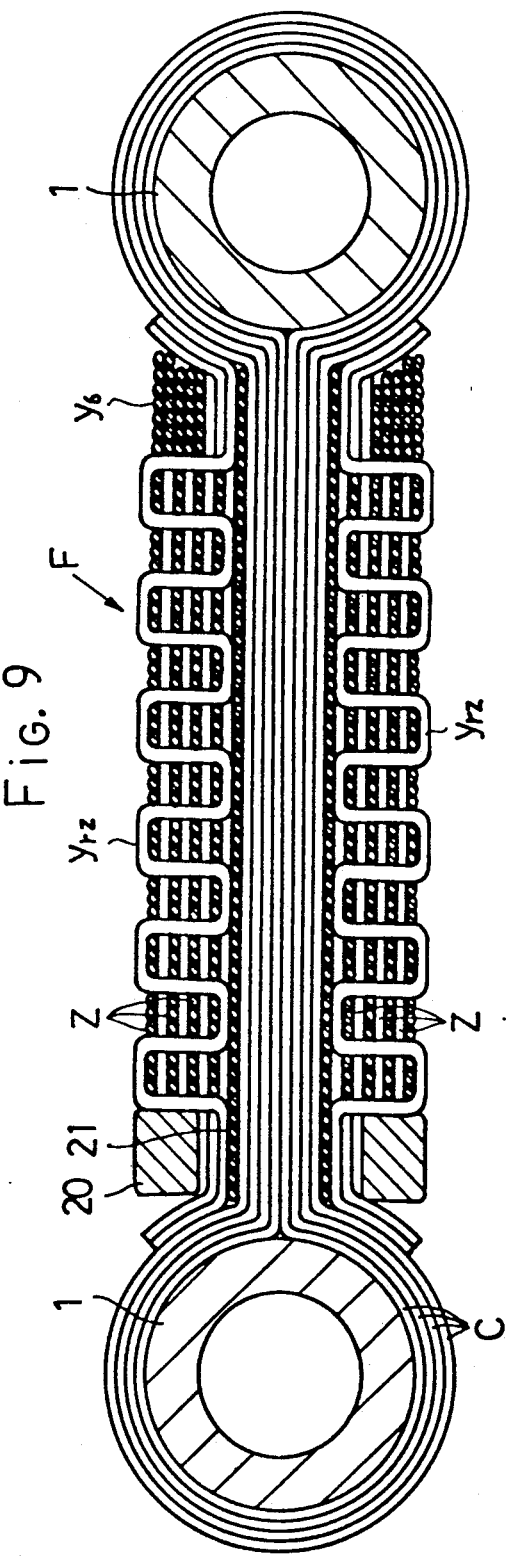

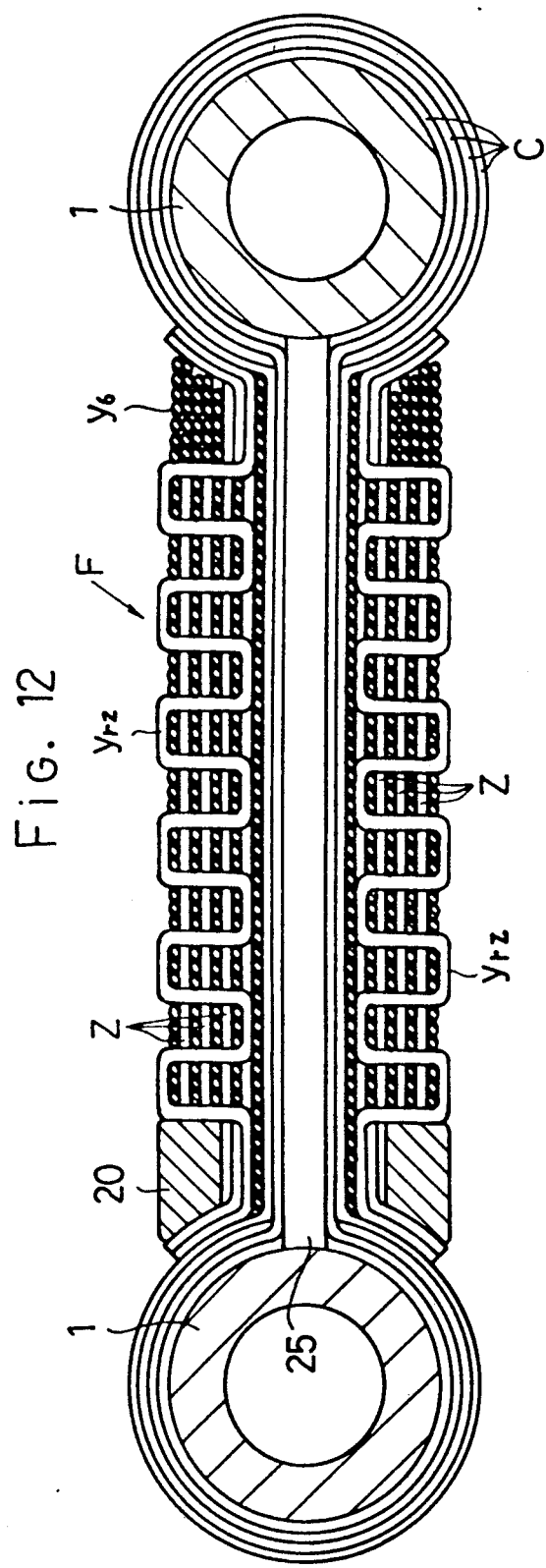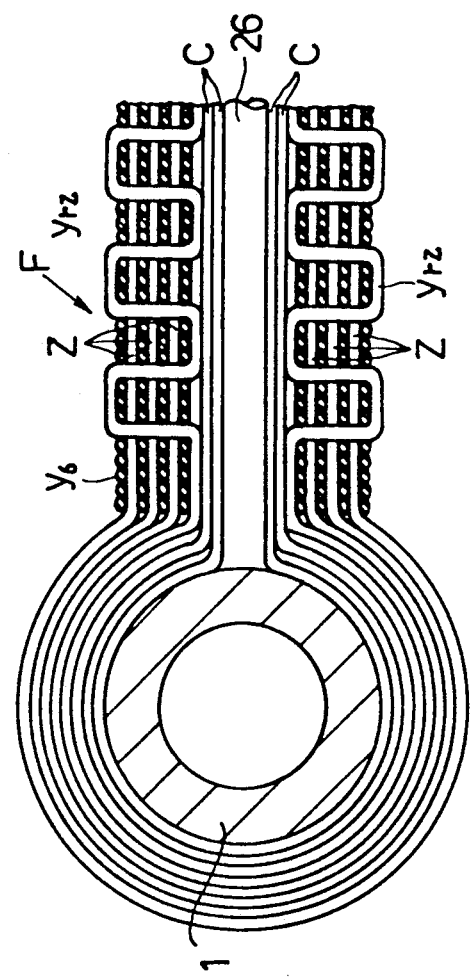

THREE-DIMENSIONAL FABRIC

This application is a continuation-in-part of co-pending U.S. application Ser. No. 07/482,345, filed Feb. 20, 1990, which is incorporated herein by reference.

The application is also related to co-pending U.S. patent application Ser. No. 07/479,352 filed Feb. 13, 1990, which is also incorporated herein by reference.

This application also claims the priority of Japanese Patent Application No. 2-219623 filed Aug. 20, 1990, which is incorporated herein by reference.

BACKGROUND OF THE INVENTION

1. Field of the Invention

The present invention relates to a three-dimensional fabric that is attached to a solid member.

2. Description of the Related Art

Composites having a three-dimensional fabric frame member that is impregnated with a resin or an inorganic matrix material are expected to be widely used as structural members in a variety of applications including rockets, aircraft, automobiles, vessels and buildings. There are two types of three-dimensional fabrics. The first takes the form of a quadratic prism or a plate. The second, which is described in the parent application Ser. No. 07/482,345 has an annular shape.

Traditionally, composites having three-dimensional fabrics as their frame members have not been suitable for coupling to other such composites. The related application Ser. No. 478,352, discloses an arrangement incorporating a solid linkage member into various non-annular three dimensional fabrics.

In contrast, prior art approaches to providing linkage members generally required cutting a whole in the fabric itself. For example, in one know method, a composite having a composite core member formed from a multiplicity of laminated cloth pieces has a hole bored therethrough. A metallic bushing is then inserted in the hole, which allows the composite to be coupled to another composite or another structural member by means of a bolt and a nut.

An application of the same approach to three dimensional fabric based materials requires that a hole be punched into the fabric in order to receive the metallic bushing. However, when a hole is cut in a composite member having a three dimensional fabric as its base, the fabric's strings are necessarily cut which significantly reduces the fabric's overall strength. To regain the strength of that portion, it would be necessary to increase the volume of the portion surrounding the metal bushing. Furthermore, if the hole is punched after a composite member has been formed, subtle cracks may be induced in the composite by the punching action. Such cracks create stress concentrations which weaken the composite member and make it extremely difficult to calculate a given member's actual strength.

SUMMARY OF THE INVENTION

It is therefore an object of the present invention to provide an annular three-dimensional fabric having a built in linkage arrangement suitable for coupling the fabric to other members.

Another objective is to provide a strong linkage assembly that is relatively compact and whose strength can be readily calculated to facilitate design considerations.

To achieve the above objects, the three-dimensional fabric according to the present invention includes a core located in a center portion of the fabric. A multiplicity of axially extending warp yarns are arranged in a plurality of concentric layers about the core. A circumferential yarn is wound in a circumferential direction between various layers of the warp yarns to forming a plurality of circumferential yarn layers. A multiplicity of radial yarns are sequentially woven in the axial and radial directions about various circumferential yarn layers. A solid member is also provided which has a group of axially extending yarn strings secured thereto. The axially extending yarn strings include strings that constitute a portion of at least one of the core and the warp yarns.

In preferred embodiments, the solid member may be a linkage such as a bushing located at the end portion of the fabric. The three-dimensional fabric may also be inpregnated with a matrix material to form a composite material. In some embodiments, various yarn strands are secured to the solid member by being wound thereabout.

BRIEF DESCRIPTION OF THE DRAWINGS

FIG. 1 is a cross section illustrating a three-dimensional fabric according to the first embodiment of the present invention;

FIG. 2 is a cross section taken along the line II—II in FIG. 1;

FIG. 3 is a cross section taken along the line III—III in FIG. 1;

FIGS. 6(a2) to 6(s2) are schematic diagrams illustrating a weaving action associated with the cross section taken along the line Y—Y in FIG. 2;

FIG. 7 is a cross section illustrating a three-dimensional fabric according to the second embodiment in the present invention;

FIG. 9 is a cross section of a three-dimensional fabric according to the third embodiment of the present invention;

FIG. 12 is a cross section illustrating a three-dimensional fabric according to the fifth embodiment of the present invention; and FIG. 13 is a cross section illustrating a three-dimensional fabric according to the sixth embodiment of the present invention.

DETAILED DESCRIPTION OF THE PREFERRED EMBODIMENTS

First Embodiment

Figure 4:
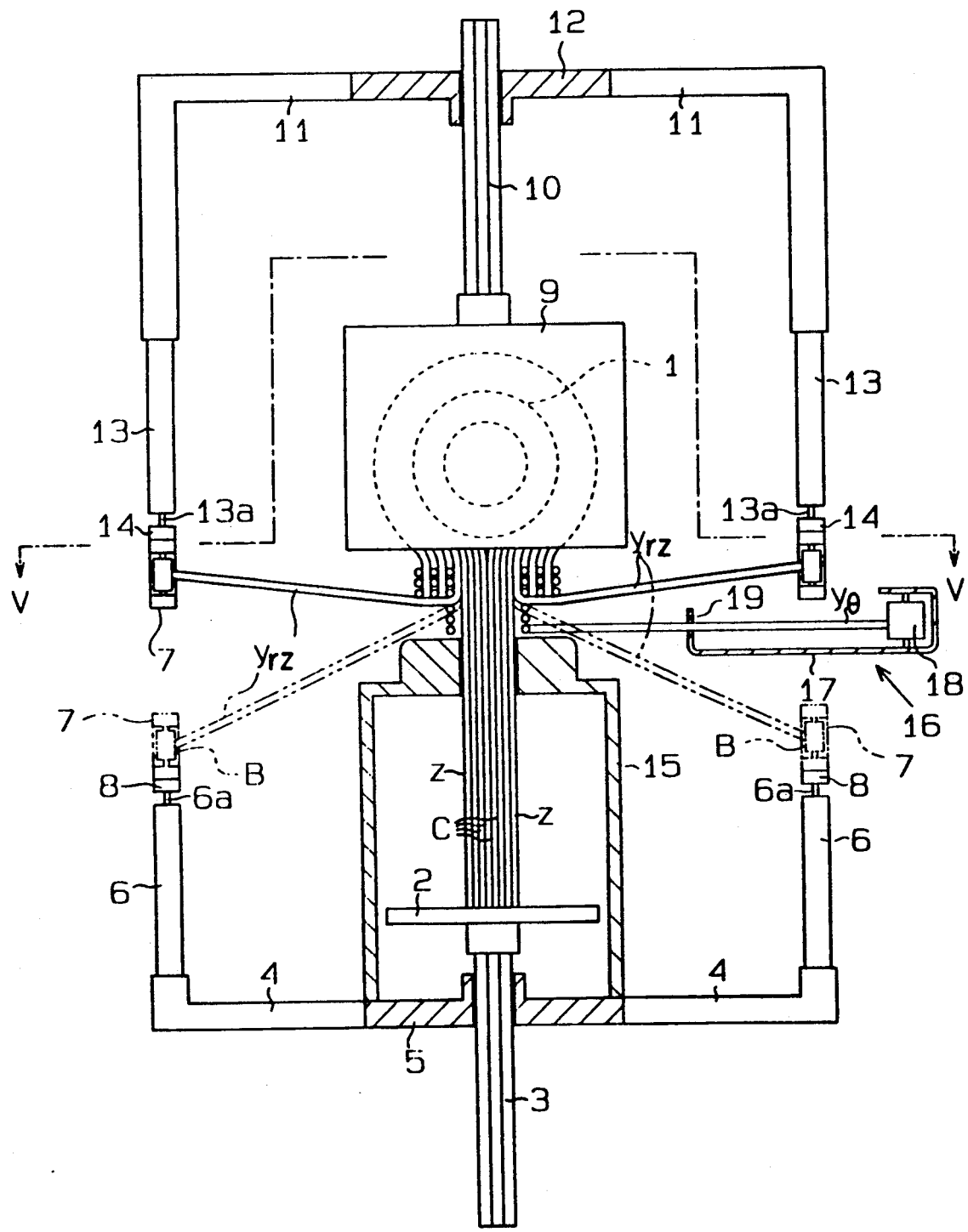
FIG. 4 is a schematic, partly cutaway front view, illustrating a three-dimensional weaving machine.

The first embodiment according to the present invention will now be described referring to FIGS. 1 to 6.

As shown in FIGS. 1 and 2, a three-dimensional fabric F is woven into a columnar shape. It includes a core formed from a plurality of core yarns C, a plurality of warp yarns z, a circumferential yarn $y_\theta$ that is wound circumferentially and a plurality of radial yarns $y_{rz}$ that are woven in the radial and axial directions. The core yarns C are positioned in the center of the fabric and extends in the axial direction. The warp yarns z are arranged in radially spaced concentric layers and extend in the axial direction. The circumferential yarn $y_\theta$ is wound between circumferential warp layers. The yarns $y_{rz}$ are woven about the innermost and outermost circumferential yarn layers. Thus it zigzags in the axial and radial directions, crossing the circumferential yarn $y_\theta$. A metal bushing 1 is arranged as a linkage member at one end of the three-dimensional fabric F. The core yarns C, the warp yarns z, the circumferential yarn $y_\theta$ and the radial yarns $y_{rz}$ are all wound around the outer wall of the metal bushing 1.

Once the three dimensional fabric has been woven, a composite can be formed by resin-impregnated the three-dimensional fabric. The resultant composite has a built in metal bushing which functions as the linkage member integrally woven into the three-dimensional fabric F. Therefore, unlike the conventional linkage arrangements, it is not necessary to mechanically process the composite in order to attach the linkage member thereto. This insures that damage will not occur during the mechanical processing. Accordingly, the strength and other properties of the fibers arranged as the three-dimensional fabric and the composite as a whole can be more readily determined.

When the composite is then coupled to another member, the load acting on the metal bushing 1, will be transmitted through the core yarns C and the warp yarns z to the body of the three-dimensional fabric F. The composite thus becomes stronger and better able to resist deformation, such as stretching, compression, twisting and bending. It also has good durability. Since the material becomes stronger at the coupling portion, the coupler itself (metal bushing 1) can be made more compact. Unlike conventional methods, the process of cutting a hole after making the composite is unnecessary. Accordingly, the strength at the coupled portion will not drop because of the concentration of stress due to a slight break occurring in the hole opening process. Furthermore, the strength at the coupling portion can be easily predicted in the stage of designing the three-dimensional fabric F.

The three-dimensional fabric F in this embodiment has all of the core yarns C, the warp yarns z and the radial yarns $y_{rz}$ wound around the metal bushing 1. The load on the metal bushing 1 is therefore divided by the core yarns C, the warp yarns z and the radial yarns $y_{rz}$, so that these yarns effectively serve to increase the strength of the coupling portion.

The method of weaving the three-dimensional fabric F above will now be described.

As shown in FIG. 4, a three-dimensional weaving machine for the three-dimensional fabric F is divided into upper and lower portions with a section for weaving the three-dimensional fabric therebetween. A yarn fixing table 2 and a spline shaft 3 are provided together in the center of the lower portion. The fixing table and spline shaft are arranged to move up and down and rotate. A supporting body 5 having a plurality of radial extending arms 4 is placed at a predetermined position on the spline shaft 3 and is rotatable therewith. The spline shaft 3 may be moved vertically relative to the supporting body 5 by a driving mechanism (not shown). An upward extending air cylinder 6 is fixed at the free end of each arm 4. Each air cylinder 6 has a piston rod 6a that carries a holder retainer 8 on its tip. The retainer 8 has an electromagnet that attracts and holds a magnetic bobbin holder 7. A bobbin B with the radial yarn $y_{rz}$ wound thereabout is held by the each bobbin holder 7.

A vertically moveable supporting member 9 is positioned above, and faces the yarn fixing table 2. The supporting member 9 is rotatable together with a spline shaft 10. The supporting member 9 supports the metal bushing 1 having the core yarns C, etc. wound thereabout and fixes the fabric yarns. A supporting body 12 having multiple radial extending arms 11 is positioned to face the supporting body 5. The supporting body 12 is fitted to the spline shaft 10 at a predetermined position and is rotatable therewith. The spline shafts 3 and 10, are completely separate from each other, but are synchronously rotated in a predetermined direction, and moved up and down. A downward extending air cylinder 13 is fixed to the free end of each arm 11. The air cylinder 13 has a piston rod 13a that carries a holder retainer 14 at its tip. Like the retainer 8, the retainer 14 attracts and holds the magnetic bobbin holder 7 with the help of an electromagnet. Each pair of the upper and lower holder retainers 8 and 14 always face each other. Each pair of the air cylinder 6 and 13 moves the each pair of holder retainer 8 and 14 up and down and the magnet is magnetized and demagnetized, so that the each pair of holder retainer exchanges the same single bobbin holder 7.

A guide frame 15 is located in the center of the upper face of the supporting body 5 to control the weaving position. A circumferential yarn supply section 16 is provided out of the rotational range of the bobbin holders 7, almost as high as the top face of the guide frame 15. The yarn supply section 16 includes a support frame 17 that is placed to the side of the spline shafts 3 and 10. A circumferential yarn bobbin 18 having the circumferential yarn $y_\theta$ wound thereabout is attached set on the outer side of the support frame 17. On the internal side of the support frame 17, a yarn guide 19 is provided to lead the circumferential yarn $y_\theta$ fed from the yarn bobbin 18 to the weaving position. The yarn guide 19 is made of a wear-resistant material. The support frame 17 may be provided with a proper tension imparting device attached as needed.

The operation of the three-dimensional weaving machine described above will now be explained.

Figure 5:
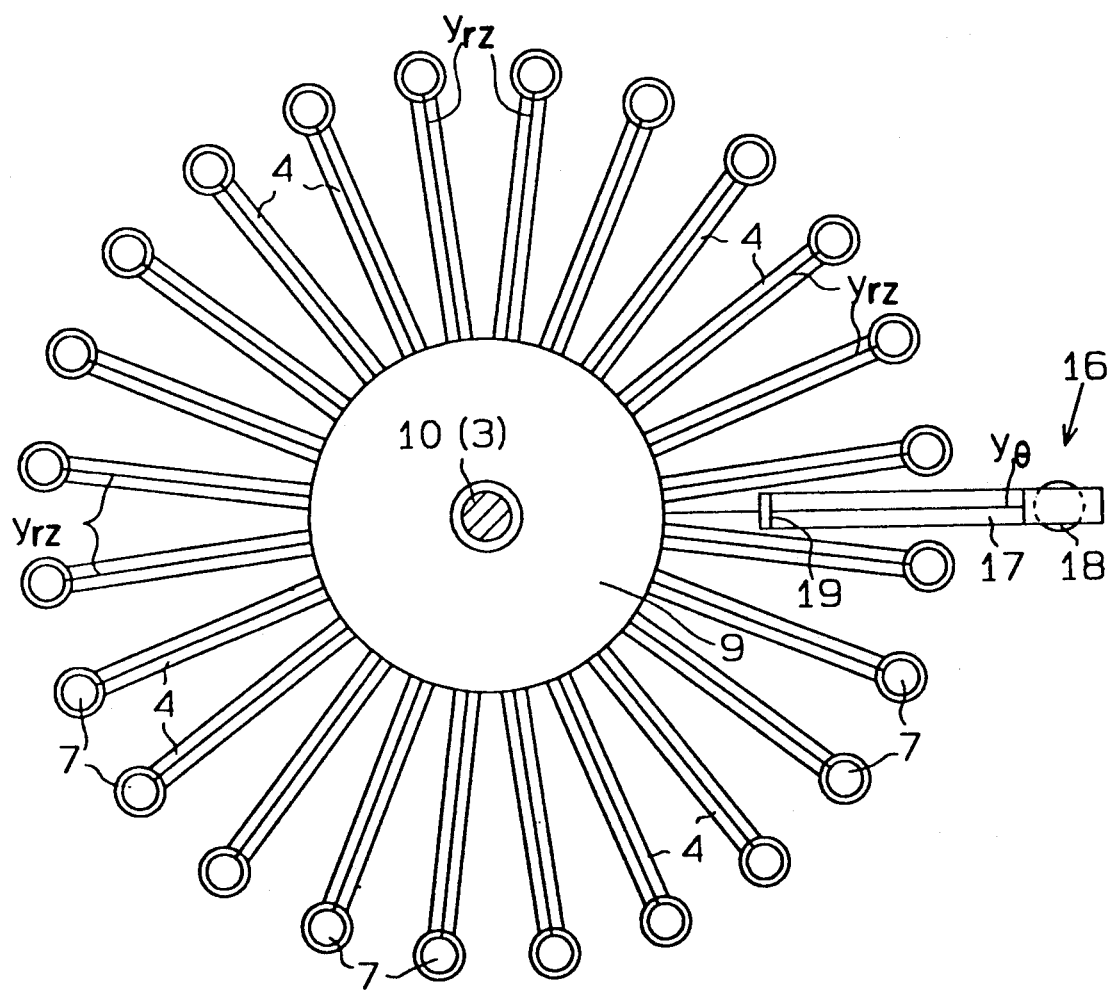
FIG. 5 is a cross section taken along the line V—V in FIG. 4.

For weaving the three-dimensional fabric, predetermined strands of the core yarns C, the warp yarns z, the circumferential yarn $y_\theta$ and the radial yarns $y_{rz}$ are wound around the metal bushing 1. Then, the metal bushing 1 is securely supported on the supporting member 9. The core yarns C are wrapped around the metal bushing 1 so that a middle portion of each yarn is turned about the bushing. Then, both ends are fixed to the center of the yarn fixing table 2. The warp yarns z and the radial yarns $y_{rz}$ are each set so that the nearly central portion of each yarn to be woven (some margin for the yarn should be provided) is wrapped around the metal bushing 1 with both ends wound around an appropriate bobbin B. The circumferential yarn $y_\theta$ is fed from the circumferential yarn bobbin 18, and is then wound around the metal bushing 1, with the ends of the yarn fixed to the supporting member 9. Accordingly, the radial yarn strands $y_{rz}$ (including the one that is woven as a warp string z) are arranged radially about the spline shafts 3 and 10, as shown in FIG. 5. The weaving then starts with the various bobbin holders 7 being transferred back and forth between the respective upper and lower holder retainers 8 and 14 according to weaving conditions.

In setting the warp yarns z and the radial yarns $y_{rz}$, the yarn strings may be pulled from one bobbin B and put around the metal bushing 1 and then wound around the other bobbin arranged in a similar way.

As shown in FIG. 4, the bobbins may be held in high and low positions. In the high position bobbin holders 7 are held by the associated upper retainers 14. In this position the corresponding radial yarns $y_{rz}$ are positioned higher than the circumferential yarn $y_\theta$. In the low position the bobbin holders 7 are held by a lower retainer 8. In this position the corresponding radial yarns $y_{rz}$ are positioned such that it crosses the path of circumferential yarn $y_\theta$, as indicated by the two-dot chain line. Therefore, when the circumferential yarn $y_\theta$ is wound with radial yarn bobbins held in the lower position, it weaves the associated radial yarns $y_{rz}$ into the three-dimensional fabric being woven.

Figure 6:
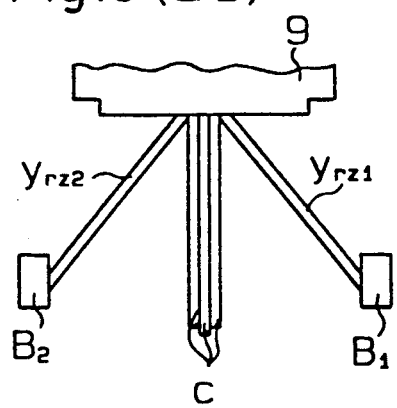
FIGS. 6(a1) to 6(s1) are schematic diagrams illustrating a weaving action associated with the cross section taken along the line X—X in FIG. 2.
Figure 6:
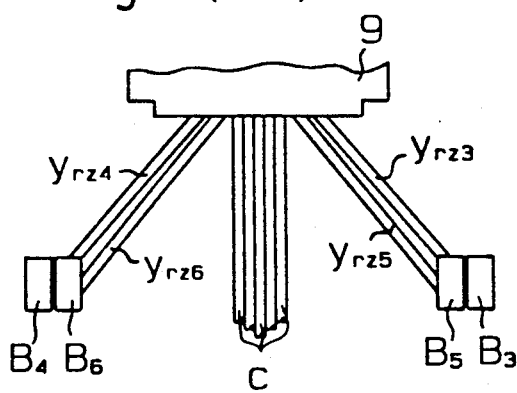
Figure 6:
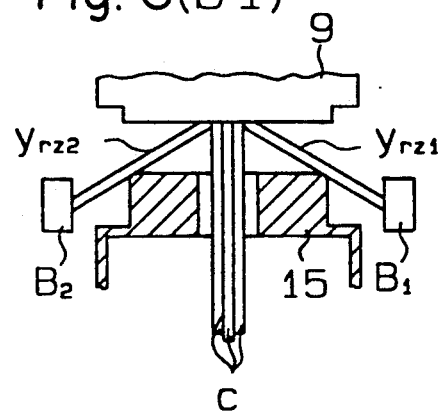
Figure 6:
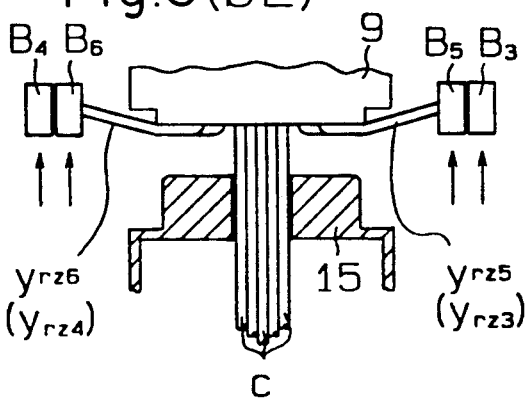
Figure 6:
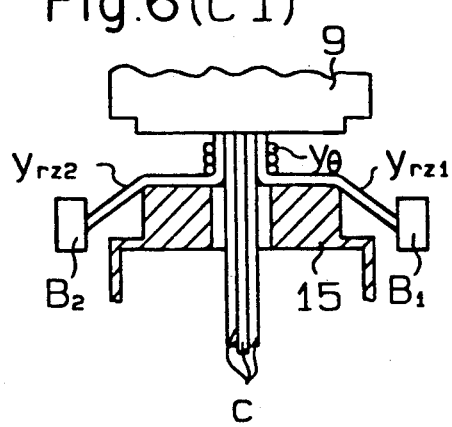
Figure 6:
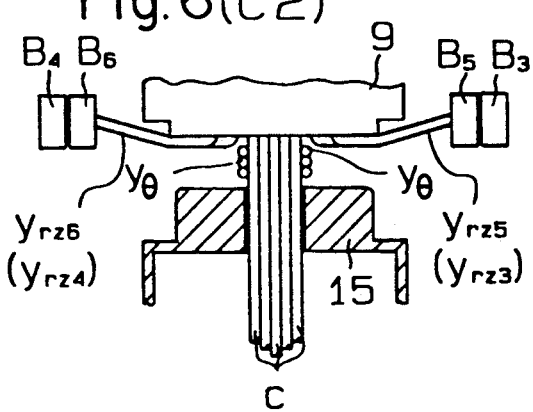
Figure 6:
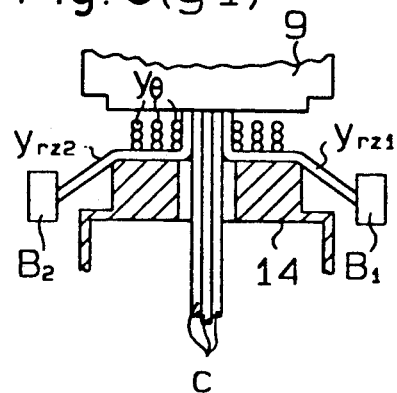
Figure 6:
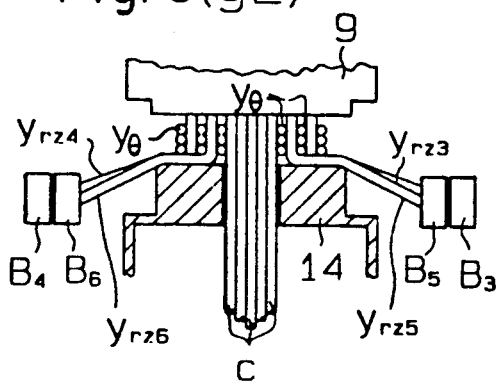
Figure 6:
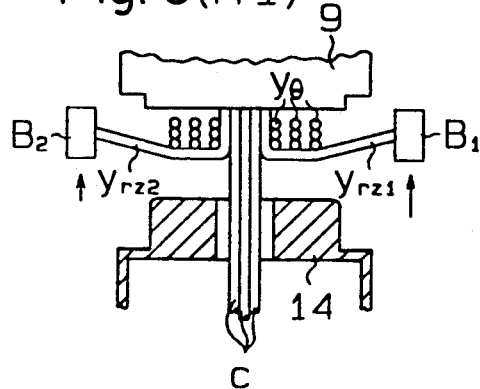
Figure 6:
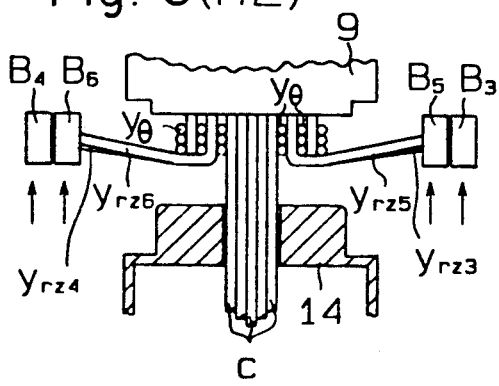
Figure 6:
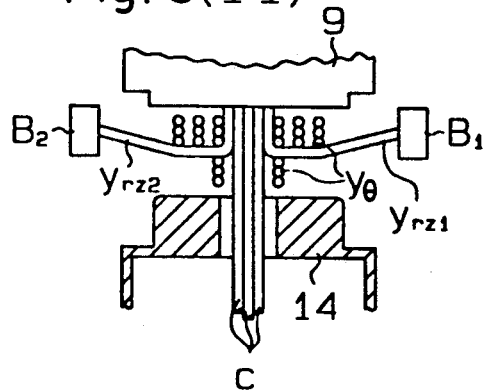
Figure 6:
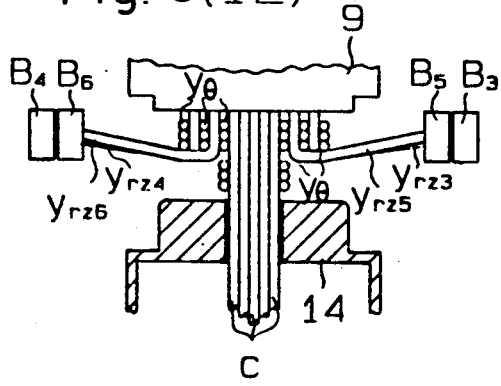
Figure 6:
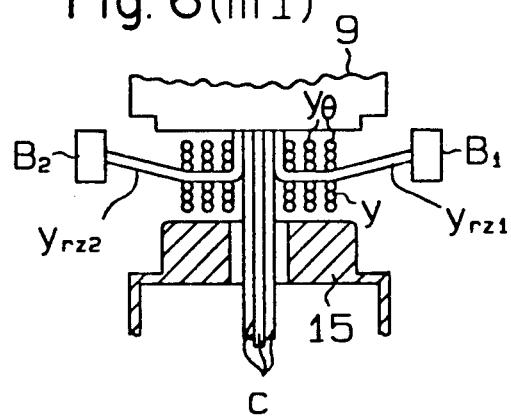
Figure 6:
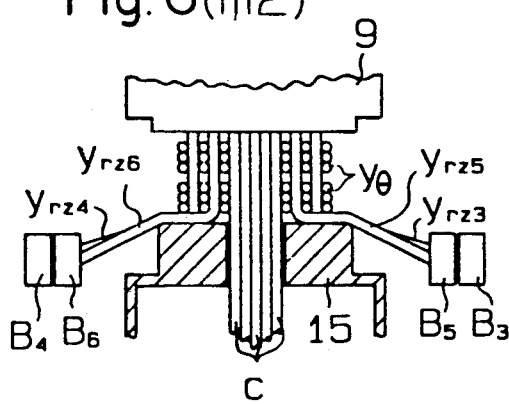
Figure 6:
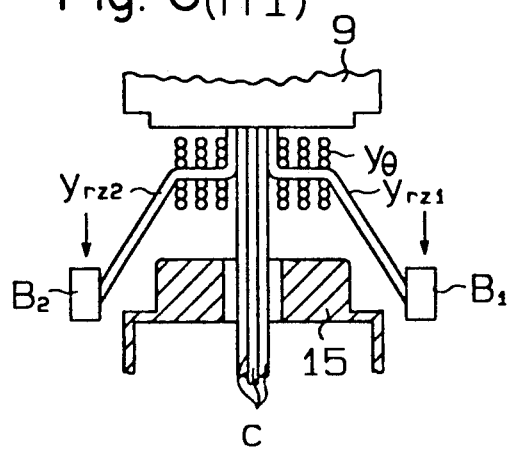
Figure 6:
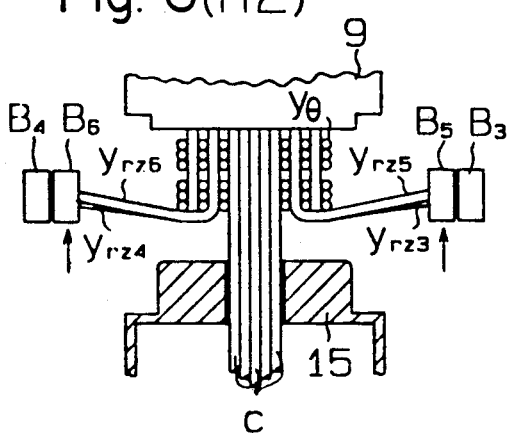
Figure 6:
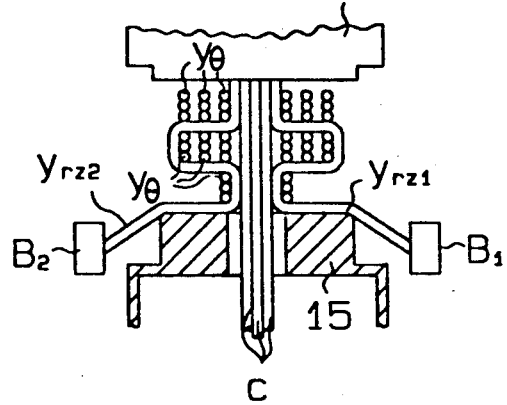
Figure 6:
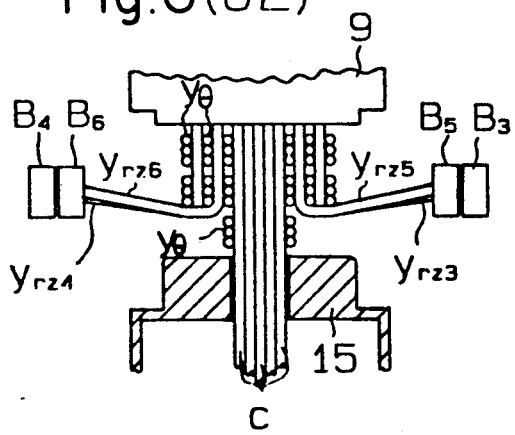
Figure 6:
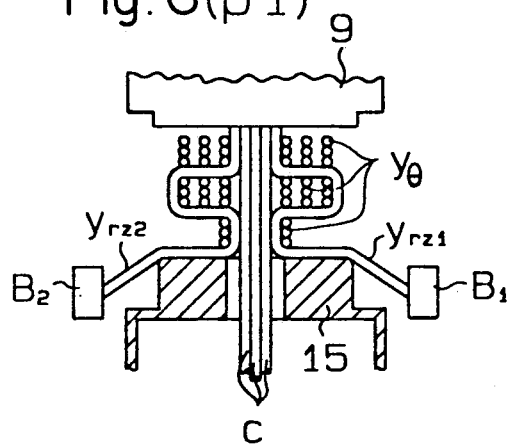
Figure 6:
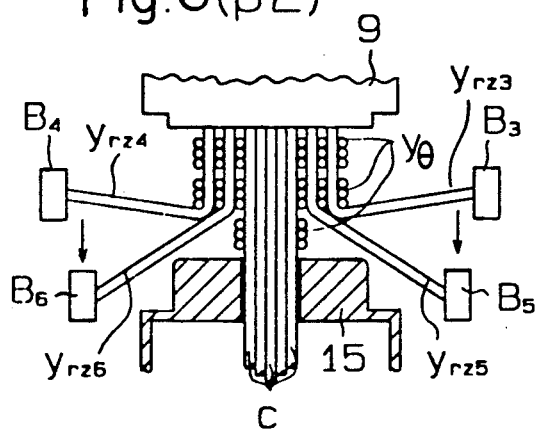
Figure 6:
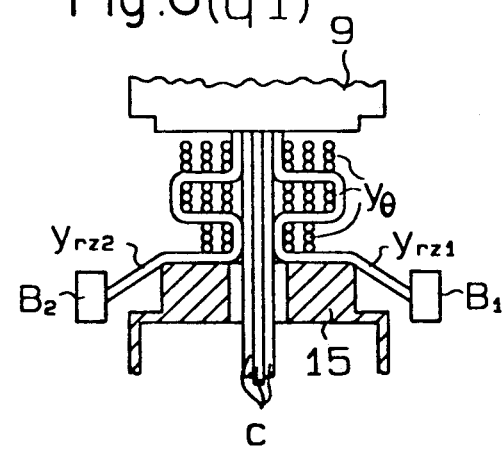
Figure 6:
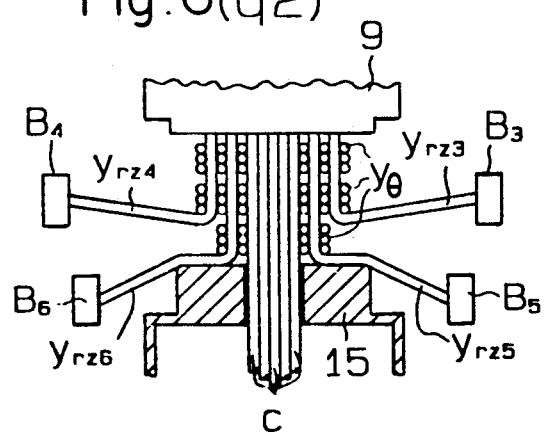
Figure 6:
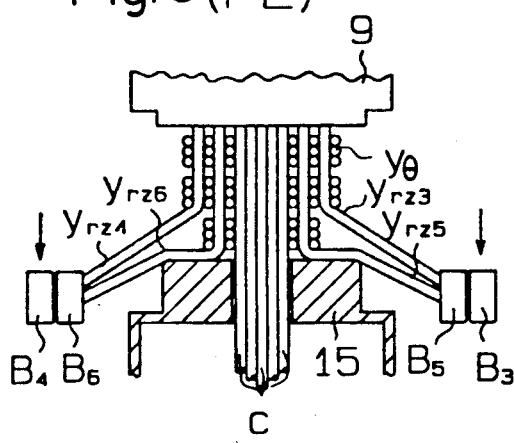
Figure 6:
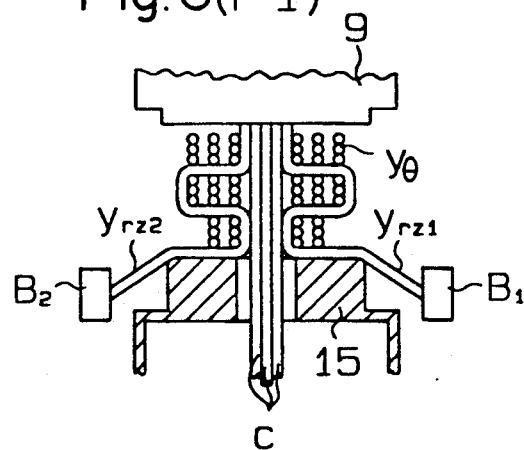
Figure 6:
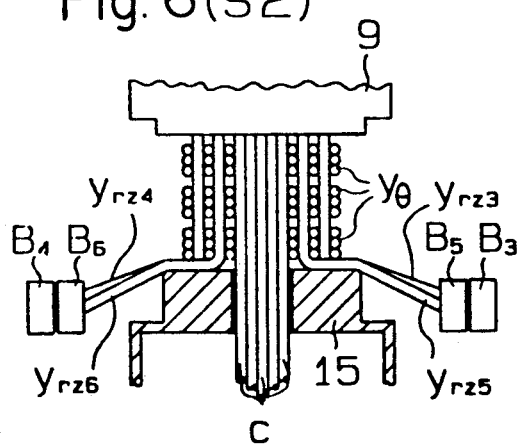
Figure 6:
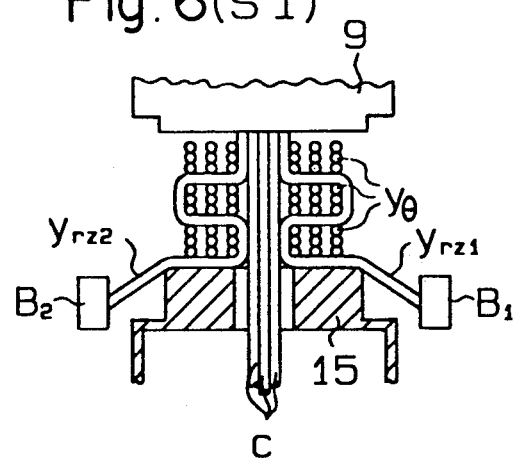

FIG. 6, (a1) and (a2) illustrate the cross sections of the three-dimensional fabric F shown in FIGS. 1 to 3, taken along the lines X—X and Y—Y in FIG. 2, before weaving begins. Initially, as shown in FIG. 6, (b1) and (b2), the radial yarns $y_{rz1}$ and $y_{rz2}$ fed from the respective bobbins B1 and B2 are stretched close to the top face of the guide frame 15 because the bobbin holders 7 (see FIG. 4) are kept in the lower holder retainers 8 when they are not in use (see FIG. 4). Four strands of the radial yarns, $y_{rz3}$, $y_{rz4}$, $y_{rz5}$ and $y_{rz6}$, respectively from other bobbins B3, B4, B5 and B6 are shifted upward close to the supporting member 9 because their bobbin holders 7 are kept in the upper holder retainers 14 (see FIG. 4). The spline shafts 3 and 10 (see FIG. 4) are rotated three turns in this position to wind the first-layer circumferential yarn $y_\theta$ around the core yarns C stretched between the yarn fixing table 2 and the supporting member 9. The radial yarns $y_{rz1}$ and $y_{rz2}$ from the respective bobbin holders 7 at the low position are woven inside the circumferential yarn $y_\theta$. As shown in FIG. 6, (c1) and (c2), therefore, the circumferential yarn $y_\theta$ is wound three layers around the core yarns C. Accordingly, the radial yarns $y_{rz1}$ and $y_{rz2}$ are pressed axially against the core by the inner face of the first circumferential yarn $y_\theta$. The four radial yarns held in the upper position, $y_{rz3}$, $y_{rz4}$, $y_{rz5}$, and $y_{rz6}$, all remain free.

Then bobbins B5 and B6 are individually shifted from the upper holder retainers 14 to the lower holder retainers 8. This positions the radial yarns $y_{rz5}$ and $y_{rz6}$ from the respective bobbins B5 and B6 near the top face of the guide frame 15, as shown in FIG. 6, (d1) and (d2). The spline shafts 3 and 10 then rotated three times to wind three turns of the second-layer circumferential yarn $y_\theta$. The radial yarns $y_{rz5}$ and $y_{rz6}$ are pressed in the axial direction while the radial yarns $y_{rz3}$ and $y_{rz4}$ are left free, as shown in FIG. 6, (e1) and (e2). Then, as illustrated in FIG. 6, (f1) and (f2), the bobbins B3 and B4 are moved down in the same manner as described above. Once again the circumferential yarn $y_\theta$ is wound by rotating the spline shafts 3 and 10. This provides the condition shown in FIG. 6, (g1) and (g2). The first weaving stage is thus completed.

Next, the three-dimensional fabric F is moved up by a predetermined length by vertically lifting the spline shafts 3 and 10. The bobbins B1 to B6 are then all lifted to the upper position which puts the radial yarns $y_{rz}$ in the arrangement shown in FIG. 6, (h1) and (h2). At this point, the spline shafts 3 and 10 rotate three times to wind three turns of the circumferential yarn $y_\theta$ which provides the condition shown in FIG. 6, (i1) and (i2). Then as shown in FIG. 6, (j2), the bobbins B5 and B6 move from the upper bobbin holders 7 to the lower holders 8, which places their radial yarns $y_{rz5}$ and $y_{rz6}$ near the guide frame 15. Again, the spline shafts 3 and 10 are rotated and the radial yarns $y_{rz5}$ and $y_{rz6}$ are pressed inward by the circumferential yarn $y_\theta$, yielding the arrangement shown in FIG. 6, (k1) and (k2). At the first weaving stage, the radial yarns $y_{rz5}$ and $y_{rz6}$ have been extended in the axial direction between the first and second layers of the circumferential yarn $y_\theta$. Both yarns are now further extended in the axial direction. As shown in FIG. 6, (12), the bobbins B3 and B4 move down, and the spline shafts 3 and 10 rotate, winding the circumferential yarn $y_\theta$ three times. At the first weaving stage, the radial yarns $y_{rz3}$ and $y_{rz4}$ of the bobbins B3 and B4 were extended in the axial direction between the second and third layers of the circumferential yarn $y_\theta$. They are now extended further in the axial direction as shown in FIG. 6, (m1) and (m2). The second weaving stage is thus completed.

Next, the three-dimensional fabric F is moved up a predetermined amount by raising the spline shafts 3 and 10. The bobbins B1 and B2 are lowered and the bobbins B3 to B6 are raised as shown in FIG. 6, (n1) and (n2). The spline shafts 3 and 10 then revolve three times, winding the circumferential yarn $y_\theta$ three more turns. The radial yarns $y_{rz1}$ and $y_{rz2}$ from the respective bobbins B1 and B2 thus extend generally radially, but are woven radially between the outermost and inner most faces of the three-dimensional fabric F, as shown in FIG. 6, (o1) and (o2). Then, the bobbins B5 and B6 are moved to the low position as shown in FIG. 6, (p2) and once again the spline shafts 3 and 10 rotate to wind the circumferential yarn $y_\theta$. The radial yarns $y_{rz5}$ and $y_{rz6}$ from the respective bobbins B5 and B6 are then pulled in the axial direction, resulting in the yarn woven state as shown in (q1) and (q2) in FIG. 6, which forms the warp yarns z. Then, the bobbins B3 and B4 are moved to the low position as shown in FIG. 6, (r2), so that the spline shafts 3 and 10 rotate to wind the circumferential yarn $y_\theta$. The radial yarns $y_{rz3}$ and $y_{rz4}$ from the respective bobbins B3 and B4 are then pulled in the axial direction between the second and third layers of the circumferential yarn $y_\theta$, resulting in the state shown in (s1) and (s2) of FIG. 6. Thus, the constitute the warp yarns z. Consequently, the third weaving stage is completed.

Thereafter, the weaving continues step by step in a likewise manner, yielding a columnar three-dimensional fabric F having the core yarns C in the center portion, like the three-dimensional fabric F shown in FIGS. 1 to 3. This three-dimensional fabric F in FIG. 6 differs from the one shown in FIGS. 1 to 3 in that the former fabric has fewer warp yarns z and core yarns C and has the circumferential yarn $y_\theta$ always wound three layers.

According to this weaving method, since specific bobbin holders 7 are always held at the low position when they revolves, the radial yarns $y_{rz3}$, $y_{rz4}$, $y_{rz5}$ and $y_{rz6}$ fed from the bobbin holder 7 are always woven to extend in the axial direction, and become the warp yarns z of the three-dimensional fabric F. The other radial yarns $y_{rz1}$ and $y_{rz2}$ are woven in such a way as to regularly repeat the alternate turning at the inside of the innermost layer (first layer) and at the outside of the outermost layer (third layer) of the circumferential yarn $y_\theta$.

Second Embodiment

The second embodiment will now be described referring to FIG. 7. The three-dimensional fabric F according to this embodiment mainly differs from the three-dimensional fabric according to the first embodiment in that it includes a pair of the metal bushings 1 provided at opposite end portions of the fabric F. The body portions of the fabrics have the same structure. However, only the core yarns C are wound around the metal bushings 1. The warp yarns z and the radial yarns $y_{rz}$ are not wound around the metal bushings 1, and the circumferential yarn $y_\theta$ is arranged around the core yarns C in the vicinity of the metal bushing 1 at the weaving-start end (right side in FIG. 7) and wound thereabout several times to firmly bundle the core yarns C, warp yarns z and radial yarns $y_{rz}$. In the proximity of the other metal bushing 1 at the other end, the end portions of the warp yarns z, radial yarns $y_{rz}$ and circumferential yarn $y_\theta$ are arranged around the core yarns C, and all the yarns are bundled and fixed by a fastener 20.

Figure 8:
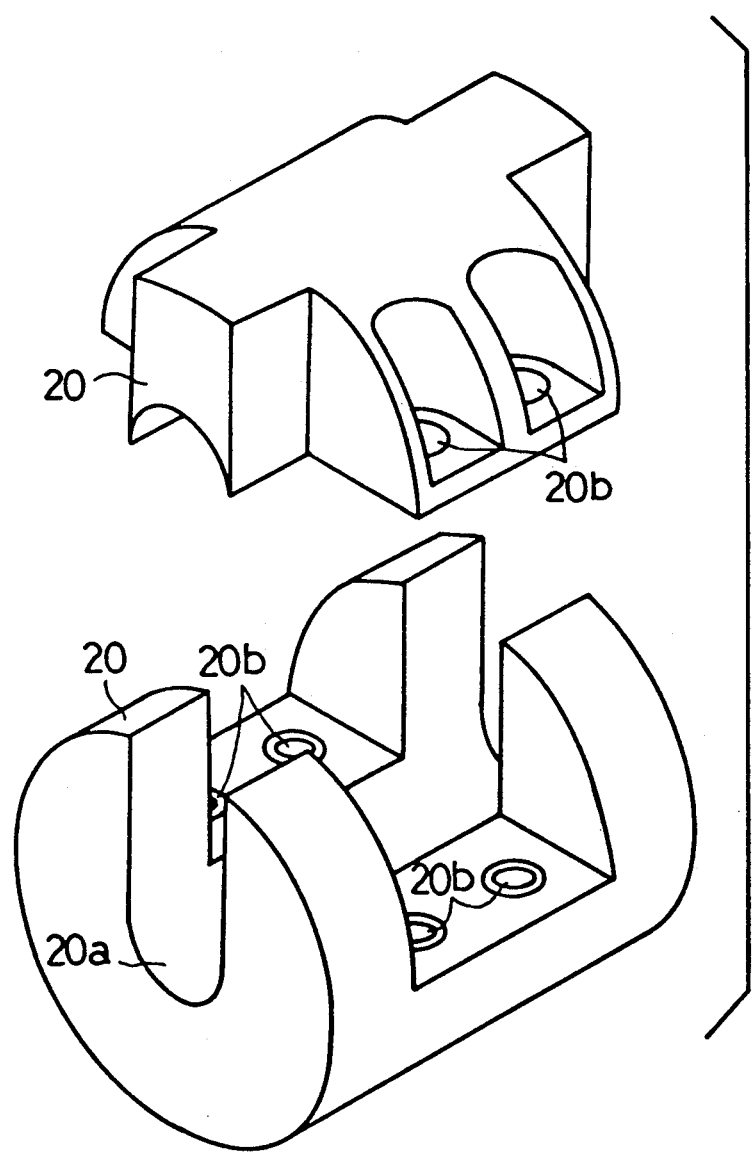
FIG. 8 is an exploded perspective view of a metal fastener.

The fastener 20 has a columnar receiving hole 20a formed at its center and is designed to be dividable into two parts as shown in FIG. 8. When the bundle of yarns is set in the receiving hole the two parts are securely fastened by means of four bolts (not shown) inserted into bolt holes 20b. To firmly fasten the bundle of yarns, the fastener 20 is designed to provide a slight gap (clearance) between the opposite faces of its two parts in the area where the bolt holes 20b are formed. The gap exists even after the bolts are fastened. To prevent the yarns from entering the clearance, the bundle of yarns may be covered with a thin sheet.

Instead of using the fastener 20, the circumferential yarn $y_\theta$ may be wound several times around the core yarns C, warp yarns z and radial yarns $y_{rz}$ to securely fasten them, as is done at the weaving-start end portion. Alternatively, they may be securely fastened together by another yarn. The fastener 20 and/or the additional yarn may thus constitute a part of the three-dimensional fabric.

In weaving the three-dimensional fabric F, first, two metal bushings 1 are fixed at a predetermined interval to a clamping machine, and the core yarns C are looped around the metal bushings. Then, the metal bushings 1 are then removed from the clamping machine, and one metal bushing 1 is securely mounted on the supporting member 9 of the three-dimensional fabric, while the other metal bushing 1 is securely mounted on the yarn fixing table 2, as described in the first embodiment. Yarns are pulled out from the individual bobbin holders 7 provided in association with a predetermined number of strands of warp yarn z and radial yarn $y_{rz}$, and the end portions of the yarns are fixed to the supporting member 9 while being arranged around the core yarns C. The end portion of the circumferential yarn $y_\theta$ is pulled out from the circumferential yarn bobbin 18 and is secured to the supporting member 9.

The circumferential yarn $y_\theta$ is then wound several times around the warp yarns z and the radial yarns $y_{rz}$ to firmly bundle the core yarns C, warp yarns z and radial yarns $y_{rz}$. This is done in the proximity of the metal bushing 1 secured to the supporting member 9. Then, while the yarn fixing table 2 is moved away from the supporting member 9 to stretch the core yarns C, weaving is carried out in the same manner as described in the first embodiment. When the weaving progresses up to the other end (the proximity of the yarn fixing table 2), the warp yarns z and radial yarns $y_{rz}$ are collected around the core yarns C and are firmly fastened inward by means of the fastener 20, thus yielding the three-dimensional fabric F.

When the fabric is being woven, it is of course necessary to set the distance between the two metal bushings 1 at a designed value. This is done by adjusting the distance between the supporting member 9 and the yarn fixing table 2, which hold the metal bushings 1. Such an adjustment provides a constant tension on the core yarns C as the weaving progresses.

Third Embodiment

The third embodiment will now be described referring to FIG. 9. Like the three-dimensional fabric F of to the second embodiment, the third embodiment has a pair of metal bushing 1 located at its opposite ends. Likewise only the core yarns C, are wound around the metal bushings 1. To sufficiently bundle the core yarns C before weaving, a winding member 21 is wrapped around the bundle of the core yarns C. It also loops around both metal bushings 1, so that the bundle is tightened from the outer circumference. The winding member 21 may take any suitable for as for example tape or yarn.

In weaving the three-dimensional fabric F, like in the second embodiment, the core yarns C are looped around both metal bushings 1. Then, the winding member 21 is wound around the core yarns C before or after the core yarns C are strung between the supporting member 9 and yarn fixing table 2. Accordingly, the core yarns C are properly positioned between the supporting member 9 and the yarn fixing table 2, and is securely supported therebetween while always being given sufficient tension. After the other yarns are fixed to the supporting member 9, the three-dimensional fabric F is woven in the same manner as done in the second embodiment.

According to the third embodiment, since the bundle of core yarns C is fixed by the winding member 21 before weaving the three-dimensional fabric F, the operability at the time of weaving the fabric is good and the roundness of the columnar three-dimensional fabric F becomes better.

Fourth Embodiment

The fourth embodiment will now be described referring to FIGS. 10 and 11. This embodiment significantly differs from the above-described individual embodiments in the use of a solid member 22 having a shape different than that of the metal bushing 1 used in the afore-mentioned embodiments. Therefore the core yarns C are secured to the solid member 22 in a different way.

The solid members 22 are provided at one or both ends of the three-dimensional fabric F. Each solid member has a bushing ring with a disk shaped flange portion 22a and a yarn holding portion 23 that protrudes from one side of a disk-shaped flange portion 22a, as shown in FIG. 11. The yarn holding portion 23 is generally cylindrical but includes a frusto-conically shaped distal end. The yarn holding portion 23 has external threads 23a formed in the outer surface of the proximal portion, and its distal end portion is split in two. A nut 24 is provided to engage the external threads 23a of the yarn holding portion 23. When the nut 24 is fastened, this portion 23 firmly holds a bundle of yarns which is set in a recess 23b.

Figure 10:
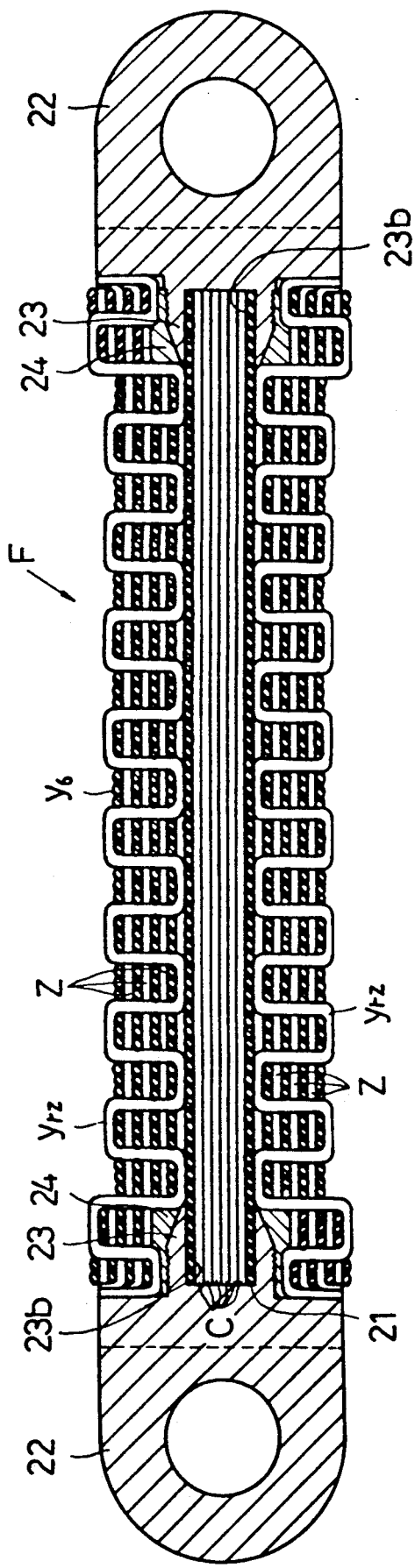
FIG. 10 is a cross section of a three-dimensional fabric according to the fourth embodiment of the present invention.
Figure 11:
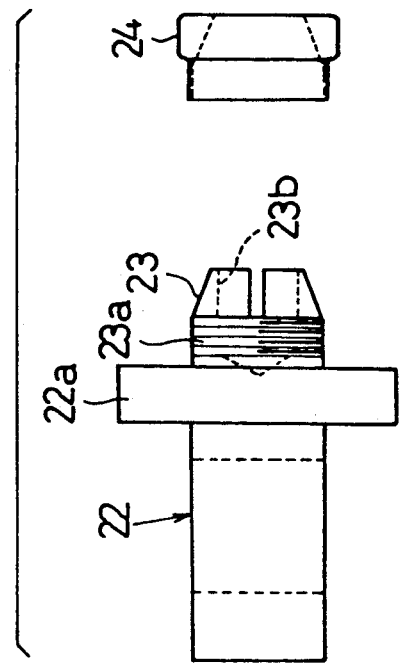
FIG. 11 is an exploded side view illustrating a linkage member.

As shown in FIG. 10, the solid member 22 may be provided at both ends of the three-dimensional fabric F. A winding member 21 in the form of a yarn string is tightly wound around the core yarns C in a spiral form as described in the third embodiment. The end portions of the core yarns C are placed in the recess 23b formed in the center of the associated solid member 22, and are held by the fastening of the nut 24. Although it is not necessary that the core yarns C be wrapped with the winding member 21, such winding makes the core yarns very easy to handle in weaving the fabric. This three-dimensional fabric F is woven in nearly the same manner as those of the previously described individual embodiments, using the three-dimensional weaving machine used in those embodiments.

Unlike the three-dimensional fabrics F of the previous embodiments, the core yarns C of the fourth embodiment are not wound around the solid members 22. Rather, the coupling force between the fabric and the solid member 22 mainly depends on the friction between the solid member 22 and the bundled core yarns C. In other words, the strength of the fibers do not enhance the coupling force between the fabric and the solid member 22 and therefore, the coupling force is weaker than the coupling force in the previous embodiments. If the nut 24 is tightened too much in an attempt to increase the friction between the solid member 22 and the bundled core yarns C, the fibers may be damaged by the fastening force. Therefore, the appropriate fastening force is limited. This fabric F is therefore relatively weak against stretching loads, but is advantageous when used under the compression loads.

Fifth Embodiment

The fifth embodiment will now be described referring to FIG. 12. The three-dimensional fabric F according to this embodiment differs from the fabric F according to the fourth embodiment in that the two metal bushings 1 are coupled together by a columnar coupling member 25. According to the fifth embodiment, the core includes both the coupling member 25 and core yarns C. In the embodiment shown, the cross section of the coupling member 25 is circular. However, it should be appreciated that a variety of other shapes including various polygonal shapes may be used as well. Although the material for the coupling member 25 can be arbitrarily selected, it is preferable to use the same material as the fabric's matrix because of the following reason. In the case where the composite is made from a three-dimensional fabric impregnated with a resin or the like, if the thermal expansion or deformation behavior of the coupling member 25 differs from that of the matrix material, the coupling member 25 is easily separated from the composite at the boundary.

Three-dimensional fabric F of the fifth embodiment, has the advantage that it is possible to set the distance between the metal bushing 1 very accurately. Additionally it makes the weaving process easier.

In weaving this three-dimensional fabric F, the core yarns C are wound around the metal bushings 1 and is set along the outer surface of the coupling member 25 with the proper looseness. Then, the core yarns C disposed outside the coupling member 25 are wrapped by a yarn string that serves as the winding member 21. Thereafter, the three-dimensional fabric around the core yarns C is woven as in the fourth embodiment.

Sixth Embodiment

The sixth embodiment will now be described referring to FIG. 13. This embodiment is the same as the first embodiment in that a metal bushing 1 is located at one end of the three-dimensional fabric F, but differs therefrom in that a rod-shaped core member 26 protrudes from the metal bushing 1. The innermost yarn layers that are wound around the metal bushing 1, are stretched along the core member 26 to form the core yarns C. The remaining yarn layers become the warp yarns z, radial yarns $y_{rz}$ and circumferential yarn $y_\theta$, which are woven outside the core yarns C to form the fabric. According to this embodiment, the core comprises the core member 26 and core yarns C.

In weaving the three-dimensional fabric F of the sixth embodiment, the presence of the core member 26 almost eliminates the need to warp the core yarns C or to otherwise endeavor to prevent the core yarns C from becoming loosened or unbundled when the core yarns C are wound around the metal bushing 1 and stretched between the supporting member 9 and yarn fixing table 2. This simplifies the weaving process.

The three-dimensional fabric F may be modified so that the core yarns C are not particularly provided. In such a modification, all the yarns wound around the metal bushing 1 are used as the warp yarns z and the radial yarns $y_{rz}$, which constitute the fabric. In this case, the core member 26 alone constitutes the core. While the material for the core member 26 can arbitrarily be selected, it is preferable that this material be close to the material for the composite formed around the core member 26.

The present invention is not limited to the above-described individual embodiments, but may be modified in various manners without departing from the scope and spirit of the invention. For instance, the warp yarns (axial yarns) z may be inclined relative to the axial direction. Moreover, the radial yarns $y_{rz}$ may be woven in such a way that at least some are bent between arbitrary layers of the circumferential yarn $y_\theta$ instead of being turned about the innermost and outermost circumferential yarn layers. Alternatively, the number of layers of the circumferential yarn $y_\theta$ woven between the warp yarn layers and/or the radial yarns $y_{rz}$ may be changed in the axial direction of a fabric, thereby providing a three-dimensional fabric whose thickness varies along the axis.

In order to prevent the yarns wound around the metal bushing 1 from moving in the axial direction of the metal bushing 1, flanges may be provided at both end portions of the metal bushing 1 or multiple grooves may be formed in the outer surface of the metal bushing 1 along the circumference to receive part of the yarns. Further, a yarn-inserting hole may be formed in part of the metal bushing 1 so that some of the core yarns C, warp yarns z and/or radial yarns $y_{rz}$ are wound around the metal bushing 1 and then inserted into the hole. Furthermore, the solid member to be woven into the three-dimensional fabric F may be designed to have a shape different from that of the solid member used in the various embodiments set forth above.

What is claimed is:
1. A three-dimensional fabric comprising:
   a core located in a center portion of the fabric;

a multiplicity of axially extending warp yarns arranged in a plurality of concentric layers;

a circumferential yarn wound in a circumferential direction between various layers of the warp yarns, the wound circumferential yarn forming a plurality of circumferential yarn layers;

a multplicity of radial yarns sequentially woven in the axial and radial directions between various circumferential yarn layers; and a solid member having a group of axially extending yarn strings secured thereto, the axially extending yarn strings including strings that constitute a portion of at least one of the core and the warp yarns.

2. A three-dimensional fabric according to claim 1, wherein at least a portion of the core is formed from a multiplicity of core yarn strands that extend in the axial direction of the fabric.

3. A three-dimensional fabric according to claim 2, wherein at least a portion of the core yarns are secured to the solid member.

4. A three-dimensional fabric according to claim 1, wherein the core is a columnar solid.

5. A three-dimensional fabric according to claim 1, wherein at least a portion of the warp yarns are secured to the solid member.

6. A three-dimensional fabric according to claim 1, wherein the yarn strings secured to the solid member are wound around the solid member.

7. A three-dimensional fabric according to claim 1, wherein at least some of the warp yarns are inclined relative to the axial direction.

* * * * *